S. R. PARSLOW.
MILLING MACHINE.
APPLICATION FILED FEB. 23, 1917.

1,261,432.

Patented Apr. 2, 1918.
4 SHEETS—SHEET 1.

Inventor,
Samuel R. Parslow

Lothrop & Johnson
his Attorneys

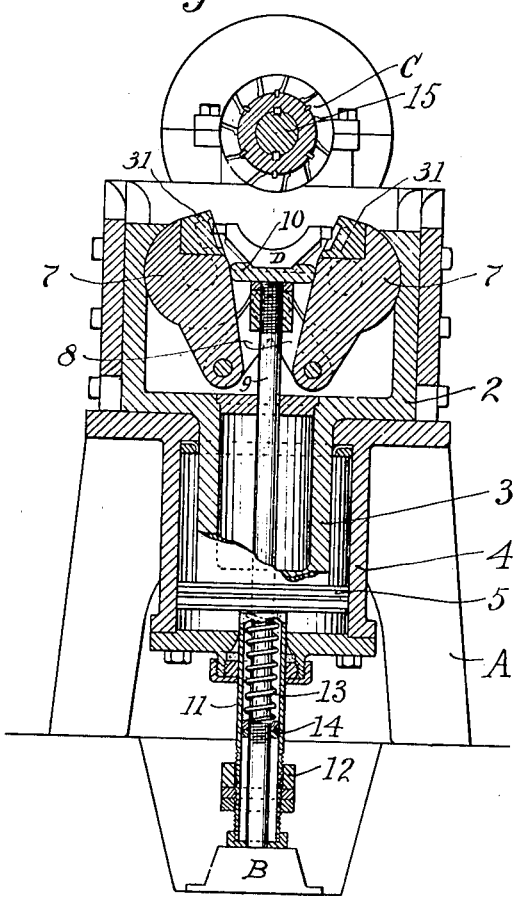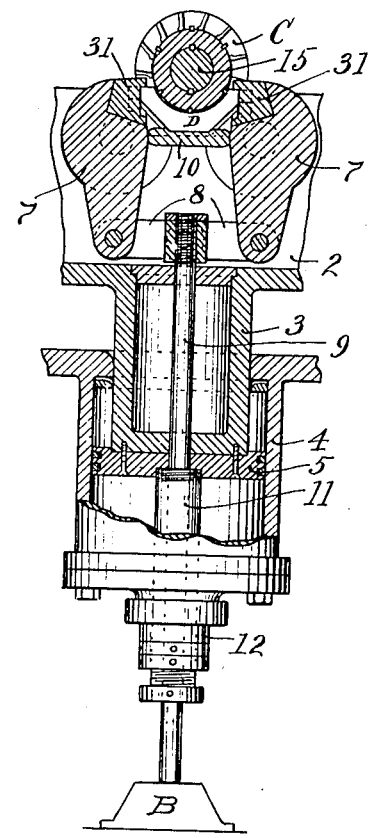

S. R. PARSLOW.
MILLING MACHINE.
APPLICATION FILED FEB. 23, 1917.
1,261,432.
Patented Apr. 2, 1918.
4 SHEETS—SHEET 3.
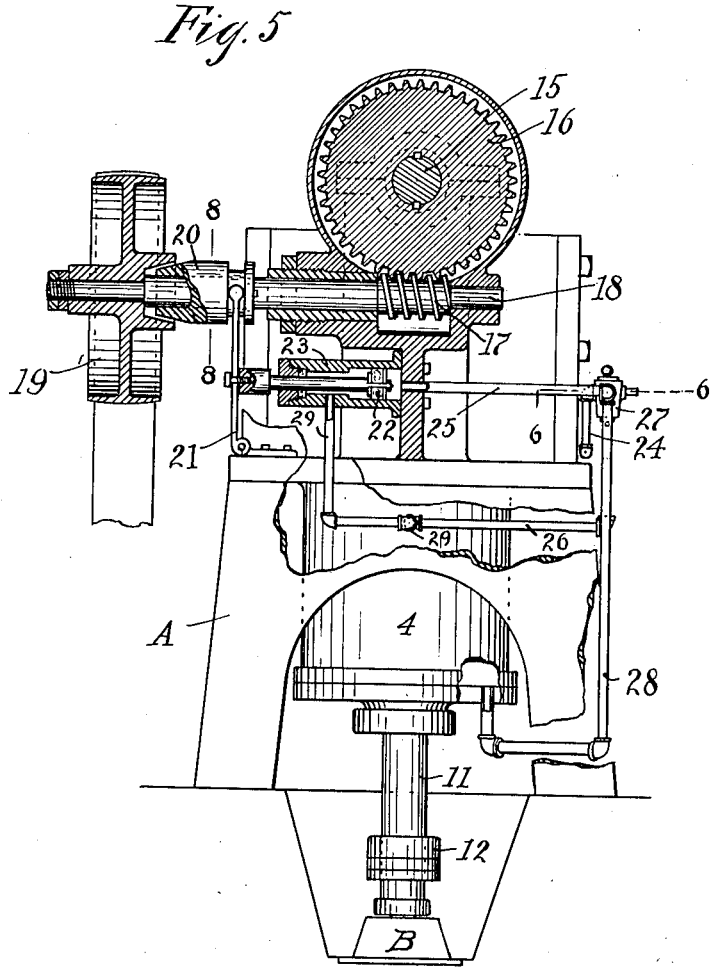
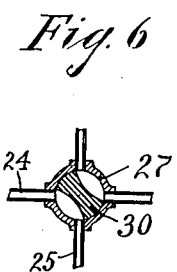
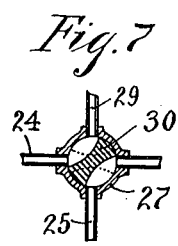
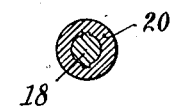
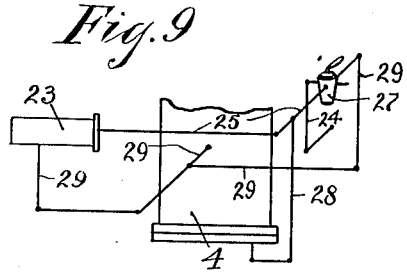
Inventor,
Samuel R. Parslow
Lothrop & Johnson
his Attorneys.

S. R. PARSLOW.
MILLING MACHINE.
APPLICATION FILED FEB. 23, 1917.

1,261,432.

Patented Apr. 2, 1918.
4 SHEETS—SHEET 4.

Inventor,
Samuel R. Parslow
Lothrop & Johnson
his Attorneys

UNITED STATES PATENT OFFICE.

SAMUEL R. PARSLOW, OF ST. PAUL, MINNESOTA, ASSIGNOR OF ONE-HALF TO JAMES GRANT, OF ST. PAUL, MINNESOTA.

MILLING-MACHINE.

1,261,432.   Specification of Letters Patent.   Patented Apr. 2, 1918.

Application filed February 23, 1917. Serial No. 150,388.

*To all whom it may concern:*

Be it known that I, SAMUEL R. PARSLOW, a subject of the King of Great Britain and Ireland, residing at St. Paul, in the county of Ramsey and State of Minnesota, have invented certain new and useful Improvements in Milling-Machines, of which the following is a specification.

My invention relates to improvements in milling machines, its object being to provide an improved machine particularly adaptable to machining car brasses, and consists essentially in the improvements in the means for holding the brass while being machined, and in improved actuating mechanism for the operating parts of the machine.

To this end the invention consists in the construction, combination, and arrangement of parts hereinafter described and claimed.

In the accompanying drawings forming part of this specification,

Fig. 3 is a section on line 3—3 of Fig. 1, shown partly in elevation and showing the parts in inoperative position.

Fig. 4 is a view also taken on line 3—3 of Fig. 1 but with the parts more broken away and more sectioned, and showing the parts in position for machining a brass.

Fig. 5 is a section on line 5—5 of Fig. 1 with a portion of the machinery shown in elevation and broken away.

Figs. 6 and 7 are sections on lines 6—6 of Fig. 5 showing the controlling valve in opposite positions.

Fig. 8 is a section on line 8—8 of Fig. 5.

Fig. 9 is a diagrammatic view of the compressed air connections of the machine.

Figure 1:
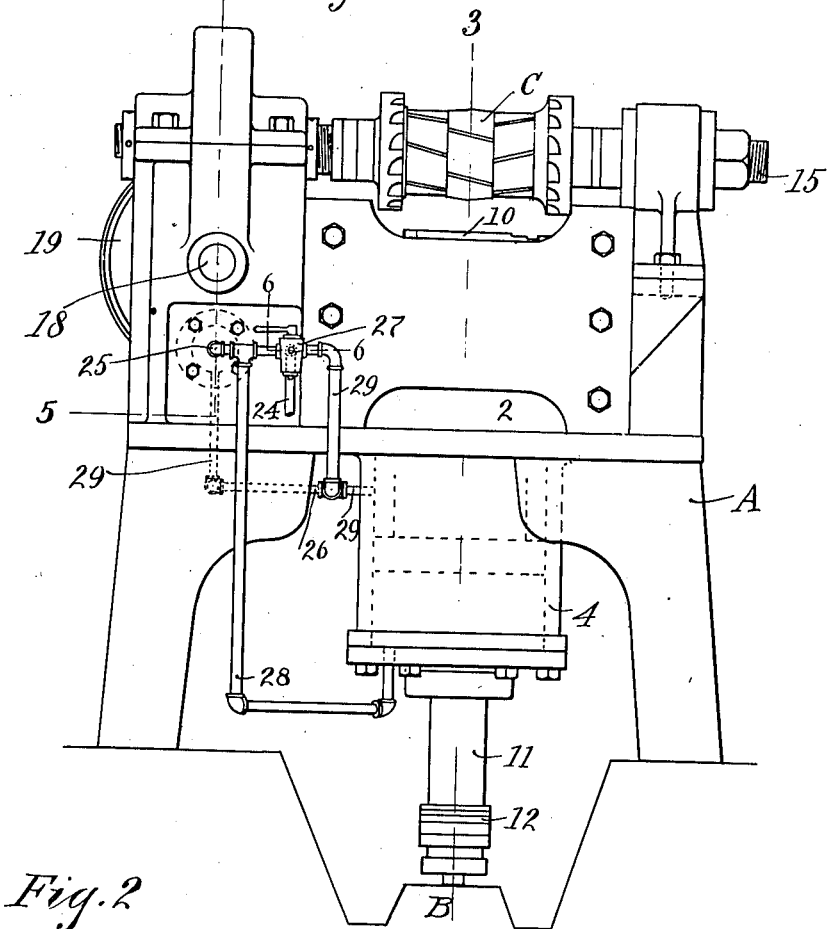
Figure 1 is a side elevation of my improved machine.
Figure 2:
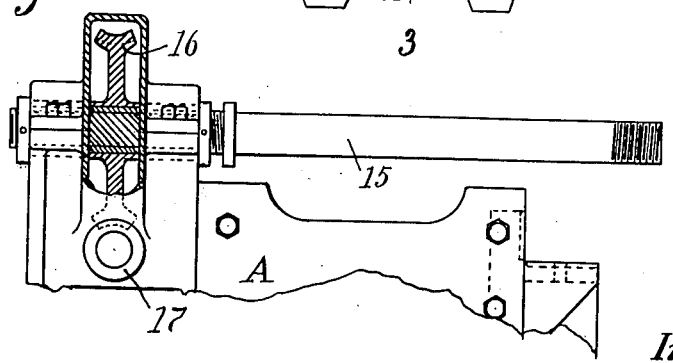
Fig. 2 is a fragmentary portion of Fig. 1 partly in section.

Referring to the drawings A represents the frame work of a machine within which is supported a slidable chuck frame 2. The chuck frame is formed with a central portion 3 extending downwardly into a chamber 4, the portion 3 supporting on its lower end a piston 5 fitted within said chamber. In the operation of the machine as hereinafter described the chuck holder is raised by admitting compressed air into the chamber 4 below the piston and is forced from a raised to a lowered position by admitting compressed air into the chamber above the piston.

Figure 10:
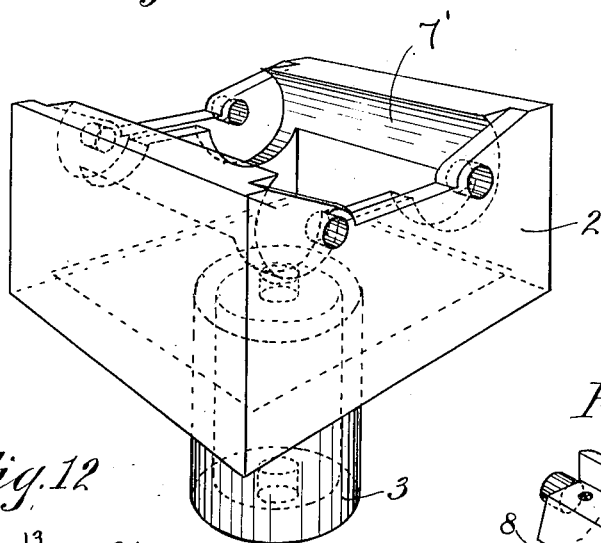
Fig. 10 is an elevation of a chuck holder forming part of my invention.
Figure 11:
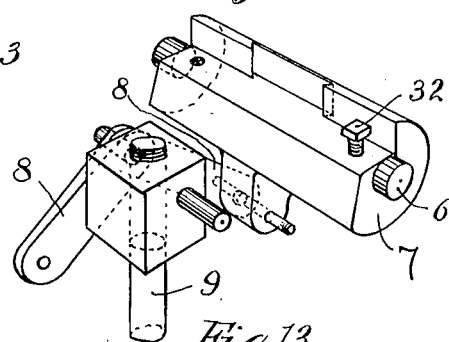
Fig. 11 is an elevation of a jaw member and connected parts forming part of my invention.
Figure 12:
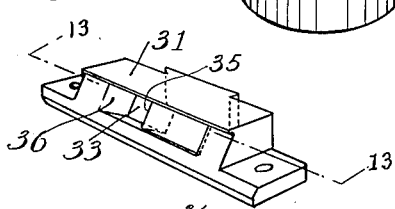
Fig. 12 is a detail of a clamping block forming part of the jaw member.
Figure 14:
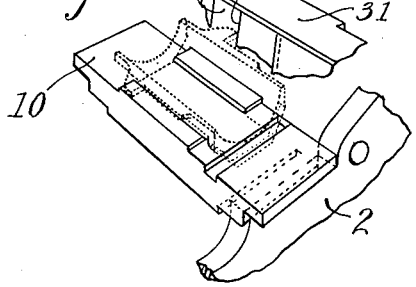
Fig. 14 is a detail view of the chuck bed showing a brass in dotted lines positioned thereon.

Having pivotal support within the hollowed top of the chuck holder is a pair of jaws 7. As shown in Fig. 10 the side walls of the top of the chuck holder are cut away at 7' to form bearing seats for the curved outer faces of the jaws. The lower ends of the jaws have link connection 8 with the upper end of a rod 9, said rod 9 supporting at its extreme upper end a chuck bed or work sustaining member 10. The rod 9 extends slidably through the bottom of the chuck holder and at its lower end rests upon a base B. Supported by the piston and extending downwardly therefrom is a sleeve 11 surrounding the rod 9, a collar 12 being adjustably secured upon the sleeve so as to form a stop, as hereinafter set forth. A coil spring 13 surrounds the rod 9, said coil spring at one end abutting against the piston and its lower end abutting against a nut 14 secured upon the rod.

Having suitable journal support above the chuck holder is a milling cutter C of suitable design. The cutter C is mounted upon a suitable shaft 15 journaled in the ends of the machine. For the purpose of rotating the cutter supporting shaft I preferably provide a worm wheel 16 secured upon the shaft 15 and meshing with a worm 17 carried by a transverse shaft 18, the worm shaft 18 being connected with a pulley 19 through the medium of a throw in and out clutch 20.

For the purpose of actuating the clutch 20 through the medium of compressed air, and at the same time directing compressed air into the chamber 4 above or below the piston 5 I provide the following features. Fulcrumed on the frame work of the machine is an actuating lever 21 for the clutch 20, the lever engaging said clutch at its outer end. The lever arm 21 is intermediately connected with a piston 22 slidable in the cylinder 23. One end of the cylinder 23 is connected with the main compressed air supply pipe 24 by a pipe 25, the other end being connected by pipe 26. The pipes 25 and 26 lead to a supply pipe 24 through a valve 27. The pipe 25 is also connected by a pipe 28 with the chamber 4 below the piston, and the pipe 26 is connected by a pipe 29 with the chamber 4 above the piston. The valve 27 includes a rotary valve core 30, by means of which valve core the supply pipe may be set, as shown in Fig. 6 to direct the air through the pipes 25 and into one end of the cylinder 23 to throw in the clutch 20 and to also direct air into the bottom of the chamber 4 below the piston, or may be set as shown in Fig. 7 to direct air into the opposite end of the cylinder 23, to disconnect the clutch 20, and at the same time direct air into the top of the chamber 4 above the piston 5 to lower the chuck holder.

Figure 13:
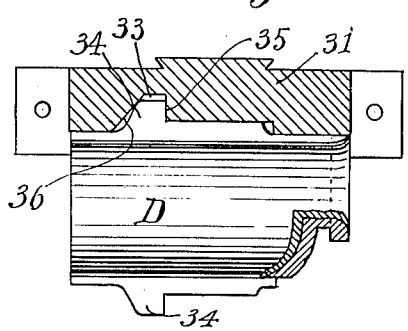
Fig. 13 is a section on line 13—13 of Fig. 12.

In Figs. 10 to 14 I illustrate my particular mechanism for supporting the brass D upon the chuck bed. Removably supported by each jaw is a clamping block 31, said block being supported upon the jaw as by screws 32. The block upon its inner side is formed with openings 33 to receive the ordinary ears 34 on the sides of the brass. In order to bring the brass to a properly adjusted position I form a square shoulder 35 at one side of the opening 33 against which the squared end of the ear 34 of the brass abuts, the opposite end 36 of the opening being flared to strike the flared side of the ear and force the brass to position as indicated in Fig. 13. For different sizes of brasses different sized blocks 31 may be employed. In use, the brass will be supported upon the chuck bed, as illustrated in dotted lines in Fig. 14. The valve core 30 will then be turned to direct the air as heretofore pointed out into one end of the cylinder 23 to cause rotation of the cutter, the air at the same time passing into the lower end of the chamber 4 to raise the chuck holder and bring the supported brass into position to be trimmed or machined by the cutter.

As will be evident by referring to Figs. 3 and 4, as the chuck holder is raised it will, through the medium of the lever connections 8, first turn the jaws upon their pivots to bring the upper ends of the jaws into clamping position against the brass, the continued raising of the chuck holder bringing the brass into position to be milled by the cutter. When the milling operation is completed the turning of the valve core 30 into position shown in Fig. 7 will throw out the clutch, stopping the operation of the cutter and directing the air into the top of the chamber 4 to lower the chuck holder and release the brass. The spring 13 assists in restoring the chuck holder to normal position shown in Fig. 3.

I claim:

1. In a milling machine of the class described, the combination of a milling cutter, a movably supported work sustaining member adjacent to said cutter, jaws pivotally supported alongside said work sustaining member and means for carrying said work sustaining member toward said cutter and simultaneously turning said jaws into engagement with work supported upon said member.

2. In a milling machine the combination of a milling cutter, a work sustaining member supported adjacent to said cutter, a pair of jaws fulcrumed adjacent to said member, and compressed air actuated means for carrying said work sustaining member toward said cutter and simultaneously turning said jaws into engagement with work supported upon said member.

3. In a machine of the class described, the combination of a milling cutter, a work sustaining member supported adjacent thereto, a pair of jaws fulcrumed adjacent to said member, air actuated means for moving said work sustaining member toward said cutter, and simultaneously turning said jaws into engagement with work supported upon said member, and air actuated means for throwing said cutter into rotation as the work is carried to the same, and throwing said cutter out of rotation as the work is removed therefrom.

4. In a machine of the class described, the combination of a milling cutter, operating means therefor, and a work sustaining member supported adjacent to said cutter, air actuated means for carrying said work sustaining member to said cutter and simultaneously securing the work in supported position thereon.

5. In a machine of the class described, the combination of a milling cutter, operating means therefor, a work sustaining member supported adjacent to said cutter, air actuated means for carrying said work sustaining member to said cutter and simultaneously securing the work in supported position thereon, and air actuated means for throwing said cutter into and out of operative connection with its actuating means.

6. In a machine of the class described, the combination of a milling cutter, actuating means therefor, a work supporting member arranged adjacent to said cutter, a pair of jaws fulcrumed alongside said member, work engaging members removably supported by said jaws and air actuated means for carrying said work supporting member to said cutter and simultaneously turning said jaws to bring said work engaging members into locking engagement with work supported upon said work supporting member.

7. In a machine of the class described, the combination of a milling cutter, operating means therefor, a work supporting member arranged adjacent to said cutter, a pair of jaws fulcrumed alongside said member, a piston supporting said work supporting member and jaws, a cylinder containing said piston, and means for admitting air to the said cylinder to raise said piston for the purpose set forth.

8. In a machine of the class described, the combination of a milling cutter, operating means therefor, a work supporting member arranged adjacent to said cutter, a supporting piston for said member, a cylinder inclosing said piston, jaws fulcrumed alongside said work supporting member, means for admitting compressed air into said cylinder to raise said piston and work supporting member, and lever mechanism connecting said jaws and actuatable to turn said jaws into gripping engagement with work upon said work supporting member as said piston is raised.

9. In a machine of the class described, the combination of a milling cutter, operating means therefor, a chuck holder having a hollow top, a piston carried by the bottom of said chuck holder, a cylinder inclosing said piston, a chuck bed supported in the hollow top of said chuck holder, jaws fulcrumed in said chuck holder alongside said chuck bed and means for admitting compressed air into said cylinder upon either side of said piston for the purpose set forth.

10. In a machine of the class described, the combination of a milling cutter, operating means therefor, a chuck holder having a hollow top, a piston carried by the bottom of said chuck holder, a cylinder inclosing said piston, a chuck bed supported in the hollow top of said chuck holder, jaws supported in said hollow chuck holder, a relatively stationary rod, lever connections between the power ends of said jaws and said rod, and means for admitting compressed air into said cylinder upon either side of said piston to raise or lower said chuck holder and to turn said jaws out of or into engagement with work on said chuck bed in the manner set forth.

11. In a machine of the class described, the combination of a milling cutter, operating means therefor, and a work sustaining member supported adjacent to said cutter, air actuated means for carrying said work sustaining member to said cutter and simultaneously securing the work in supported position thereon, and an air actuated clutch for throwing said cutter into and out of connection with its operating means as said work sustaining member is carried to said cutter and away from said cutter respectively.

In testimony whereof I affix my signature in presence of two witnesses.

SAMUEL R. PARSLOW.

Witnesses:
H. S. JOHNSON,
BEATRICE BROWN.